(12) United States Patent
Patrick et al.

(10) Patent No.: US 11,677,636 B2
(45) Date of Patent: *Jun. 13, 2023

(54) SYSTEMS AND METHODS FOR PREDICTING FAILURE OF A NETWORK DEVICE

(71) Applicant: Verizon Patent and Licensing Inc., Basking Ridge, NJ (US)

(72) Inventors: Randy Patrick, Cleves, OH (US); Jason A. Birr, Lithia, FL (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,404

(22) Filed: Jul. 8, 2022

(65) Prior Publication Data

US 2022/0345375 A1     Oct. 27, 2022

Related U.S. Application Data

(63) Continuation of application No. 17/101,855, filed on Nov. 23, 2020, now Pat. No. 11,398,957.

(51) Int. Cl.
*H04L 29/08*     (2006.01)
*H04L 41/147*    (2022.01)
*H04L 41/16*     (2022.01)

(52) U.S. Cl.
CPC .......... *H04L 41/147* (2013.01); *H04L 41/16* (2013.01)

(58) Field of Classification Search
CPC .................. H04L 41/147; H04L 41/16
See application file for complete search history.

(56) References Cited

U.S. PATENT DOCUMENTS

2019/0253328 A1*   8/2019   Kolar ............... G06F 11/3006
2020/0067952 A1*   2/2020   Deaguero .......... H04L 43/08

* cited by examiner

*Primary Examiner* — Adnan M Mirza

(57) ABSTRACT

In some implementations, a network monitoring system may measure a traffic metric for a first component of a network device. The network monitoring system may determine, based on a trained component monitoring model, that an obtained measurement of the traffic metric for the first component satisfies a criteria associated with the traffic metric pattern. The network monitoring system may compare, based on determining that the obtained measurement satisfies the criteria, the obtained measurement to a corresponding measurement of the traffic metric for a second component of the network device. The network monitoring system may determine that a measurement difference between the obtained measurement for the first component and the corresponding measurement for the second component satisfies a difference threshold. The network monitoring system may perform, based on the measurement difference satisfying the difference threshold, an action associated with the first component.

20 Claims, 7 Drawing Sheets

SYSTEMS AND METHODS FOR PREDICTING FAILURE OF A NETWORK DEVICE

RELATED APPLICATION

This application is a continuation of U.S. patent application Ser. No. 17/101,855, entitled "SYSTEMS AND METHODS FOR PREDICTING FAILURE OF A NETWORK DEVICE," filed Nov. 23, 2020 (now U.S. Pat. No. 11,398,957), which is incorporated herein by reference in its entirety.

BACKGROUND

A packet gateway of a network may include a plurality of data processing cards (DPCs) that are configured to process traffic between endpoints (e.g., user devices, data networks, and/or the like) and the network. Traffic can be balanced across the DPCs by a controller of the packet gateway. The data processing cards may be a same type and configured to operate in a similar manner. Failure of one or more DPCs can result in lost or dropped traffic.

DETAILED DESCRIPTION OF PREFERRED EMBODIMENTS

Figure 1A:
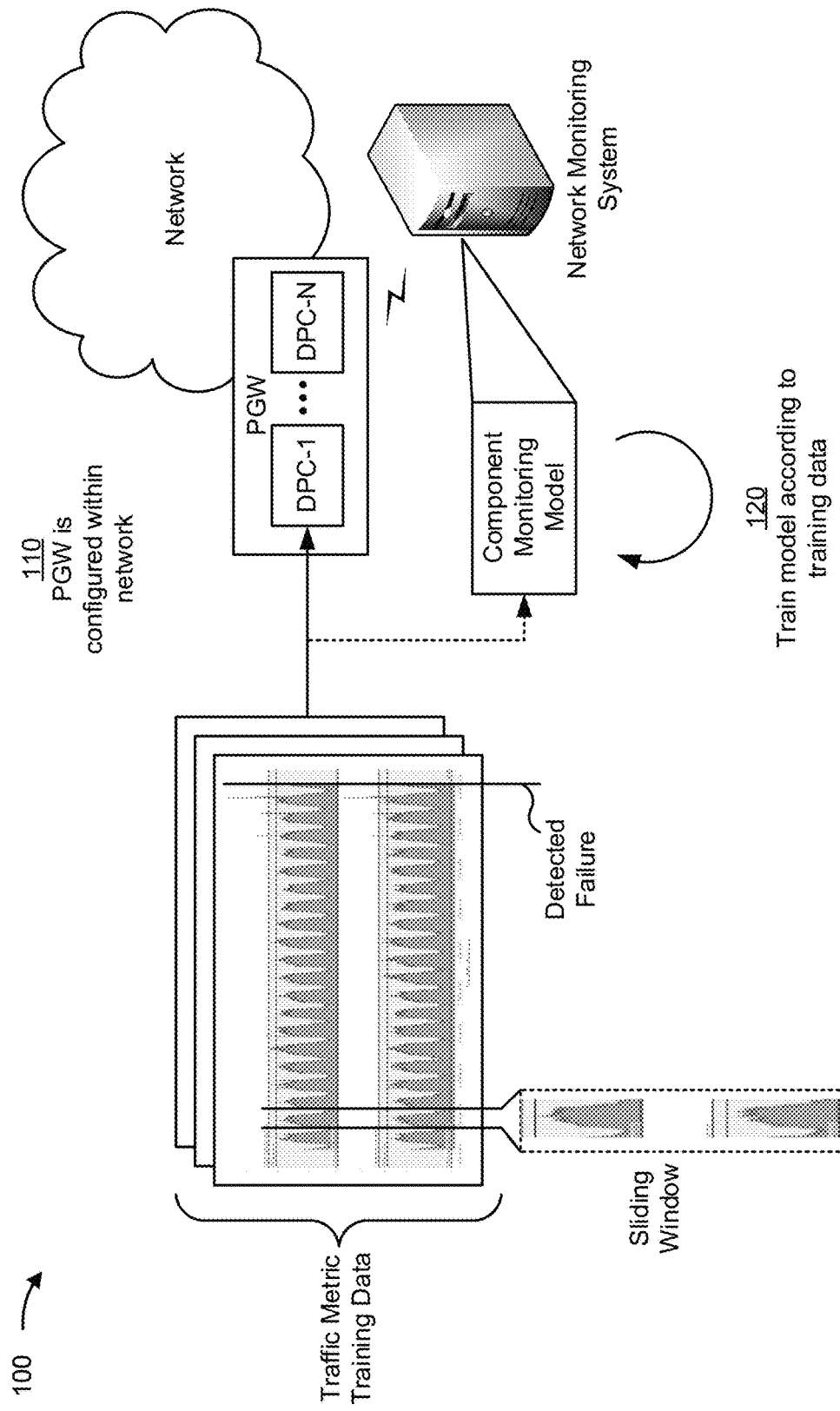
FIGS. 1A-1C are diagrams of an example associated with predicting failure of a network device.

The following detailed description of example implementations refers to the accompanying drawings. The same reference numbers in different drawings may identify the same or similar elements.

Certain network devices (e.g., packet gateways, routers, and/or the like) include a plurality of data processing cards (DPCs) that are configured to process traffic of a network. Failure of one or more of the DPCs may result in dropped traffic, a network failure, and/or session failures. Furthermore, such failures may include software failures and/or hardware failures that render the DPCs inoperable until any causes of the failure are addressed (e.g., by a technician), which results in network downtime (e.g., for at least a portion of the network) until the failed DPCs are repaired and/or replaced. While certain traffic metrics of DPCs can be monitored to detect a failure, network devices may be configured throughout a network at various locations (e.g., various physical locations and/or various network locations that are relative to a topology of the network). Accordingly, network devices of a same type and/or with a same configuration of DPCs may experience different traffic loads, may process different traffic types, and/or may provide different types of services. Therefore, monitoring traffic metrics of DPCs in a particular way at one location of a network may not be effective in detecting or predicting a failure of a DPC at a different location of the network.

Some implementations described herein provide a network monitoring system that is configured to monitor operating parameters according to specific patterns identified and/or determined for a network device that is specific to a location of the network device within the network. For example, the network monitoring system may include and/or utilize a component monitoring model that is trained based on measurements of traffic metrics of DPCs while the DPCs are processing traffic within the particular location of the network. In this way, the network monitoring system may identify traffic metric patterns for traffic received during certain iterative periods of time (e.g., daily traffic metric patterns, weekly traffic metric patterns, monthly traffic metric patterns, and/or yearly traffic metric patterns, among other examples). Based on the traffic metric patterns for detected failures of the DPCs during the training period, the network monitoring system may identify one or more failure indication patterns associated with the traffic metric patterns that are specific to the network device and/or DPCs of the network device at the specific location of the network.

In this way, the network monitoring system may learn, during the training period, failure indication patterns, to permit the network monitoring system to predict that a failure is likely to occur (e.g., within a certain period of time), and perform an action to prevent the failure and/or extend a period of time until the failure occurs. Accordingly, the network monitoring system (and/or a component monitoring model of the network monitoring system) may conserve computing resources (e.g., processing resources, memory resources, and/or the like) and/or network resources (e.g., transmission resources, receiving resources, routing resources, and/or the like) that would otherwise be consumed by communicating traffic that would otherwise be dropped without implementation of one or more of the examples described herein.

Figure 1B:
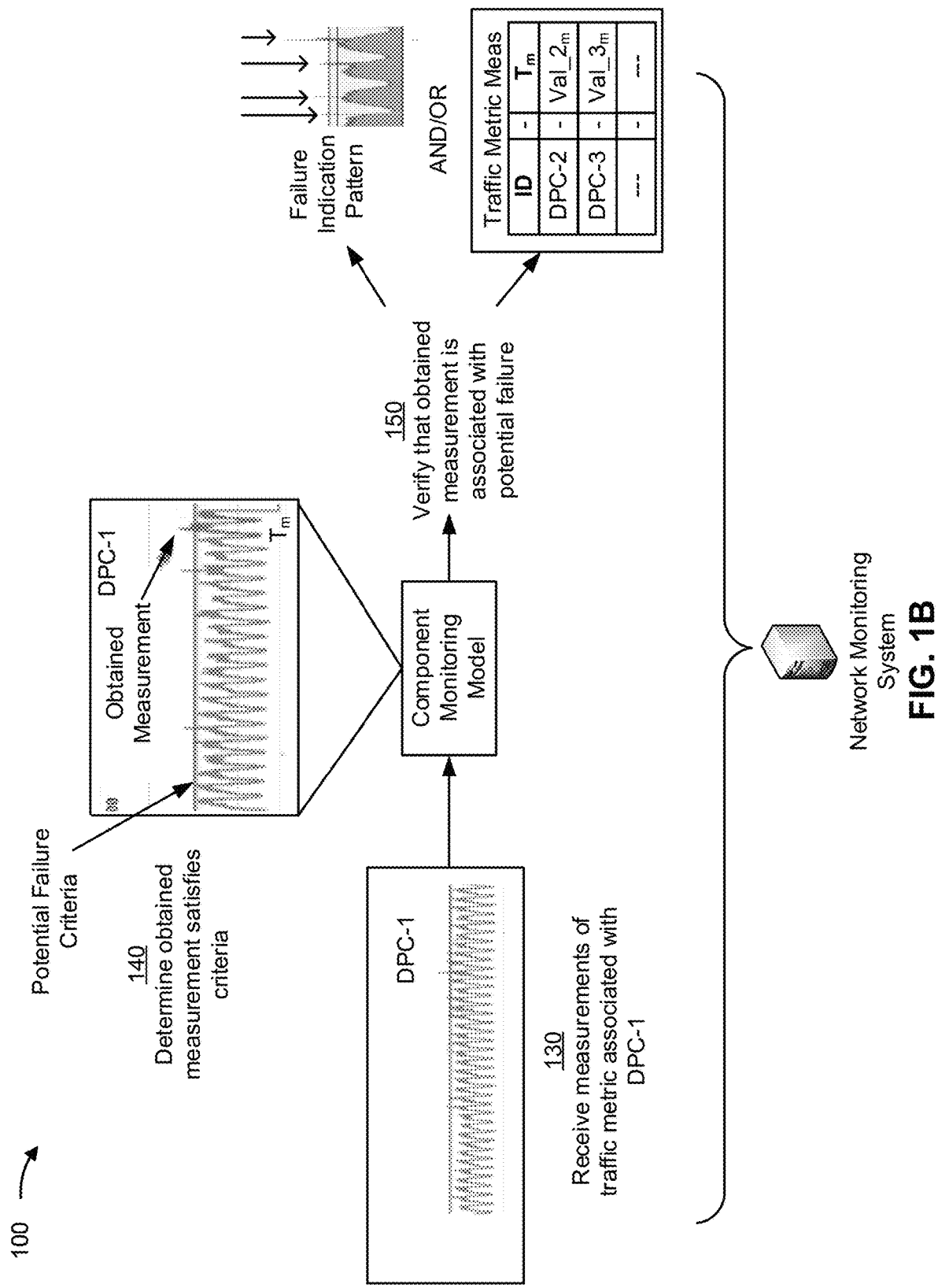
Figure 1C:
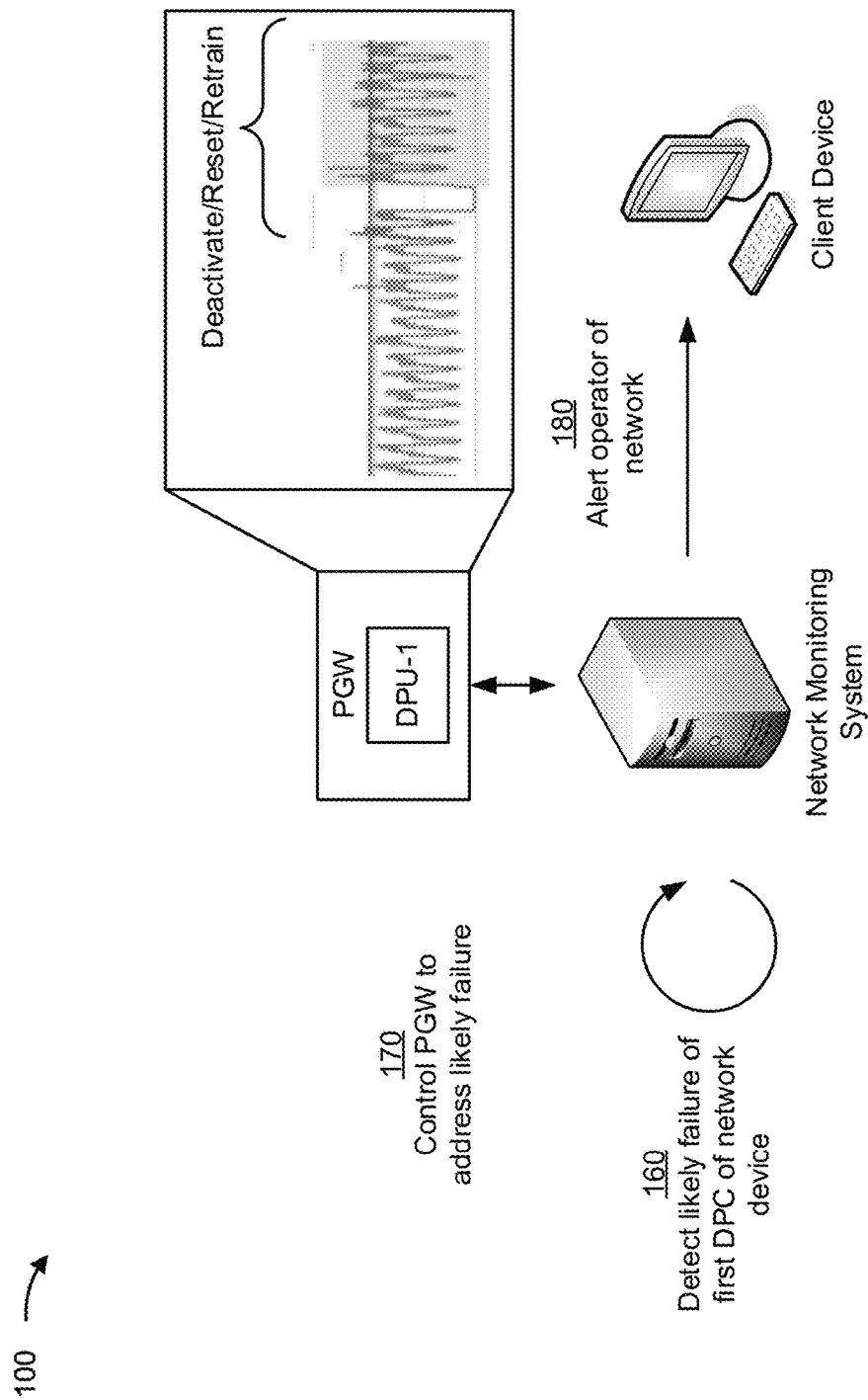

FIGS. 1A-1C are diagrams of an example 100 associated with predicting failure of a network device. As shown in FIGS. 1A-1C, example 100 includes a network monitoring system and a packet gateway (PGW) of a network. The network device includes N components, shown and referred to in example 100 as DPC-1 to DPC-N (where N is an integer and N≥1). In example 100, the network monitoring system includes a component monitoring model that is trained to predict a failure of one or more of the DPCs according to traffic metric patterns that are measured according to traffic being processed by the PGW. In some implementations, the component monitoring model is included with the PGW and/or distributed to other network devices of the gateway. While example 100 is described in connection with a PGW, examples described in connection with example 100 may similarly apply to other types of network devices and/or other network devices that are configured to be positioned with a different location of a network than a PGW. Similarly, while example 100 is described in connection with DPCs, examples described in connection with example 100 may similarly apply to other types of components of network devices.

As shown in FIG. 1A, and by reference number 110, the PGW is configured within the network. For example, the PGW may be installed within the network (e.g., physically) and/or one or more services provided by the PGW (e.g., data processing associated with policy enforcement, packet filtering, and/or the like) may be activated. In this way, the PGW and/or DPCs may be monitored within the network during a training period to permit the network monitoring system to train the component monitoring model.

As further shown in FIG. 1A, and by reference number 120, the component monitoring model is trained according to training data. The training data may include training measurements associated with a traffic metric for one or more of the DPCs during a training period. Additionally, or alternatively, the training data may include failure detection data that is associated with detected failures of one or more of the DPCs during the training period. The component monitoring model may be trained to identify one or more traffic metric patterns of traffic for the PGW and/or the DPC.

Additionally, or alternatively, the component monitoring model may be trained to identify a failure indication pattern based on a traffic metric associated with one or more of the DPCs during a training period and detected failures of the DPCs. The detected failures may be indicated within detected failure data. The detected failure data of the DPCs may be obtained based on a user input and/or generated based on the component monitoring model detecting (e.g., according to one or more traffic metrics) that the DPCs were inactive during the training period due to a failure.

As described herein, the traffic metric may be any suitable traffic metric that can be monitored for individual DPCs. For example, the traffic metric may be one or more of: a throughput of the DPC, a quantity of active traffic sessions being processed by the DPC, a load or capacity of the DPC, a processing speed of the DPC, a packet error rate (PER) of the DPC, and/or the like.

The component monitoring model may be configured to recognize (e.g., using a machine learning technique) patterns associated with the traffic metric. For example, the component monitoring model may be configured to perform a similarity analysis (e.g., using a k-nearest neighbor, a clustering technique, and/or the like) of a plurality of sliding windows of training measurements in the training data that are associated with a same time period (e.g., a portion of a day, a day, a week, a month, a year, and/or the like). Accordingly, the component monitoring model may recognize patterns (e.g., traffic metric patterns and/or failure indication patterns) associated with timing of the training measurements relative to timing of the one or more of the set of components failing. The network monitoring system may train the component monitoring model as described herein, at least in connection with FIG. 2.

In this way, the component monitoring model is trained to identify one or more patterns associated with a traffic metric of the DPCs.

As shown in FIG. 1B, and by reference number 130, the network monitoring system receives measurements of a traffic metric associated with a first DPC (shown as DPC-1). For example, the network monitoring system may be configured to monitor the measurements of the traffic metric (e.g., as a data stream), collect the measurements of the traffic metric, request the measurements of the traffic metric, and/or the like. In this way, the network monitoring system may analyze, via the component monitoring model, the measurements to determine whether one or more of the measurements indicate a potential failure of the first DPC.

As further shown in FIG. 1B, and by reference number 140, the network monitoring system, via the component monitoring model, determines that an obtained measurement satisfies a criteria (which may be referred to herein as a "potential failure criteria"). The criteria may correspond to a potential failure criteria associated with one or more thresholds, one or more profiles, or the like that are indicative of a potential failure. In some implementations, the obtained measurement may indicate a potential failure (e.g., be a measurement of a pattern that indicates a likely failure of the first DPC) if the obtained measurement corresponds to a spike or drastic change in the traffic metric (e.g., an anomalous measurement). Accordingly, the potential failure criteria may correspond to the z-score exceeding or meeting a particular threshold value (e.g., a value that is outside of threshold quantity of standard deviations). In some implementations, the z-score of the obtained measurement is based on an average of corresponding training measurements that are associated with a same time slot of the obtained measurement and a standard deviation of the corresponding training measurements.

In this way, the network monitoring system may determine that an obtained metric satisfies a potential failure criteria to permit the network monitoring system to verify that the network monitoring system indicates that the first DPC is likely to fail (e.g., within a certain time period).

As further shown in FIG. 1B, and by reference number 150, the network monitoring system verifies that the obtained measurement is associated with a potential failure. For example, as shown, the network monitoring system may compare the obtained measurement with measurements of a failure indication pattern to determine whether the obtained measurement pattern corresponds to one or more measurements of the failure indication pattern. If the obtained measurement (e.g., according to timing, value, or the like) is similar to one or more of the measurements of the failure indication pattern, the network monitoring system may further analyze the traffic metric pattern to determine whether a failure of DPC-1 is likely to occur. For example, if the obtained measurement corresponds to a last measurement of a failure indication pattern, the network monitoring system may analyze previously received traffic metric measurements. Additionally, or alternatively, if the obtained measurement corresponds to a first measurement or intermediate measurement, the network monitoring system may analyze subsequently received traffic measurements to determine whether the obtained measurement corresponds to a measurement of the failure indication pattern.

Additionally, or alternatively, to verify whether the obtained measurement indicates that the first DPC is likely to fail, the network monitoring system may compare the obtained measurement to a corresponding measurement of the traffic metric for one or more of the other components. For example, as shown, the network monitoring system may compare the obtained measurement (that took place at time ($T_m$)) to a corresponding traffic metric measurement (that is based on time ($T_m$)) for a second DPC (Val_2 of DPC-2) and/or a third DPC (Val_3 of DPC-3). If the obtained measurement is similar to Val_2 and/or Val_3, the network monitoring system may determine that the first DPC is not failing (e.g., because a same spike is being experienced by the other DPCs, so the obtained metric likely does not correlate to a failure of the first DPC). On the other hand, if the network monitoring system determines that a measurement difference between the obtained measurement for the component and the corresponding measurement for the other component satisfies a difference threshold (e.g., corresponding to a fixed ratio and/or corresponding to a z-score that is based on the obtained measurement and the measurements associated with the one or more other DPCs), the network monitoring system may determine that the first DPC is likely failing, as described herein. In some implementations, the network monitoring system may determine whether the obtained measurement is associated with a measurement of a failure indication pattern, based on the obtained measurement satisfying the difference threshold.

In this way, rather than immediately generate a failure indication that could be a false positive, the network monitoring system may verify that an obtained measurement is indicative of a likely failure of a DPC based on other measurements of DPCs of the PGW and/or measurements of a failure indication pattern. Furthermore, processing resources can be conserved based on the network monitoring system only triggering an analysis of the traffic metric pattern relative to a failure indication pattern once an obtained measurement satisfies the criteria (e.g., associated with a potential failure) and is verified as associated with a likely failure of the DPC.

As shown in FIG. 1C, and by reference number 160, the network monitoring system detects a likely failure of the first DPC. For example, the network monitoring system, based on the obtained measurement being associated with a failure indication pattern that was learned and/or determined by the component monitoring model, may determine that the first DPC is likely to fail within a certain time period (e.g., within a day, within three days, within a week, within a month, and/or the like). For example, the failure indication pattern includes a plurality of measurements that satisfy a z-score of training measurements for one or more sliding windows of the training period. According to timing between the individual measurements of the plurality of measurements, the network monitoring system may determine that the first DPC is likely to fail if the received measurements include a traffic metric pattern with a set of measurements that are similar to the failure indication pattern. The network monitoring system may utilize the component monitoring model to perform a similarity analysis (e.g., using a scoring system, a weighted average, and/or the like) and/or determine a probability that the first DPC is going to fail within a certain time period. Based on the probability satisfying a probability threshold (e.g., 80%, 90%, 95%, and/or the like) the network monitoring system may determine that the network monitoring system is likely to fail, as described herein In this way, the network monitoring system may determine that the first DPC is likely to fail within a certain time period, to permit the network monitoring system to perform one or more actions associated with the first DPC and/or the PGW.

As further shown in FIG. 1C, and by reference number 170, the network monitoring system may control the PGW to address the likely failure (e.g., reduce the risk of failure, prevent the failure, and/or extend an amount of time until the likely failure). For example, the network monitoring system may suspend one or more network services provided by the first DPC. In such a case, the network monitoring system may reassign the network services from the first DPC to other DPCs of the PGW (e.g., to the second DPC, the third DPC, and/or other DPCs of the PGW). Additionally, or alternatively, the network monitoring system may reset (e.g., cause the PGW to reset) the first DPC, and/or deactivate (e.g., cause the PGW to deactivate) the first DPC (e.g., to permit the PGW to use DPCs other than the first DPC).

As further shown in FIG. 1C, and by reference number 180, the network monitoring system may alert an operator of the network. For example, the network monitoring system may send an alert to a management device (e.g., a client device or other device used to manage the network) that indicates the probability that the first DPC fails within a certain time period. Accordingly, the network operator may address (e.g., repair, debug, and/or replace) the first DPC. In some implementations, the network monitoring system may schedule a repair and/or replacement of the DPC and indicate timing associated with the scheduled repair or replacement.

In this way, a network monitoring system is configured to monitor components of a network device using a component monitoring model that is trained according to network device-specific and/or network location-specific traffic and/or traffic metrics. Accordingly, the network monitoring system may accurately predict a failure of a component of network device, thereby preventing the network device and/or a network from experiencing shutdowns that would otherwise occur without using or implementing a network monitoring system, as described herein.

As indicated above, FIGS. 1A-1C are provided as an example. Other examples may differ from what is described with regard to FIGS. 1A-1C.

Figure 2:
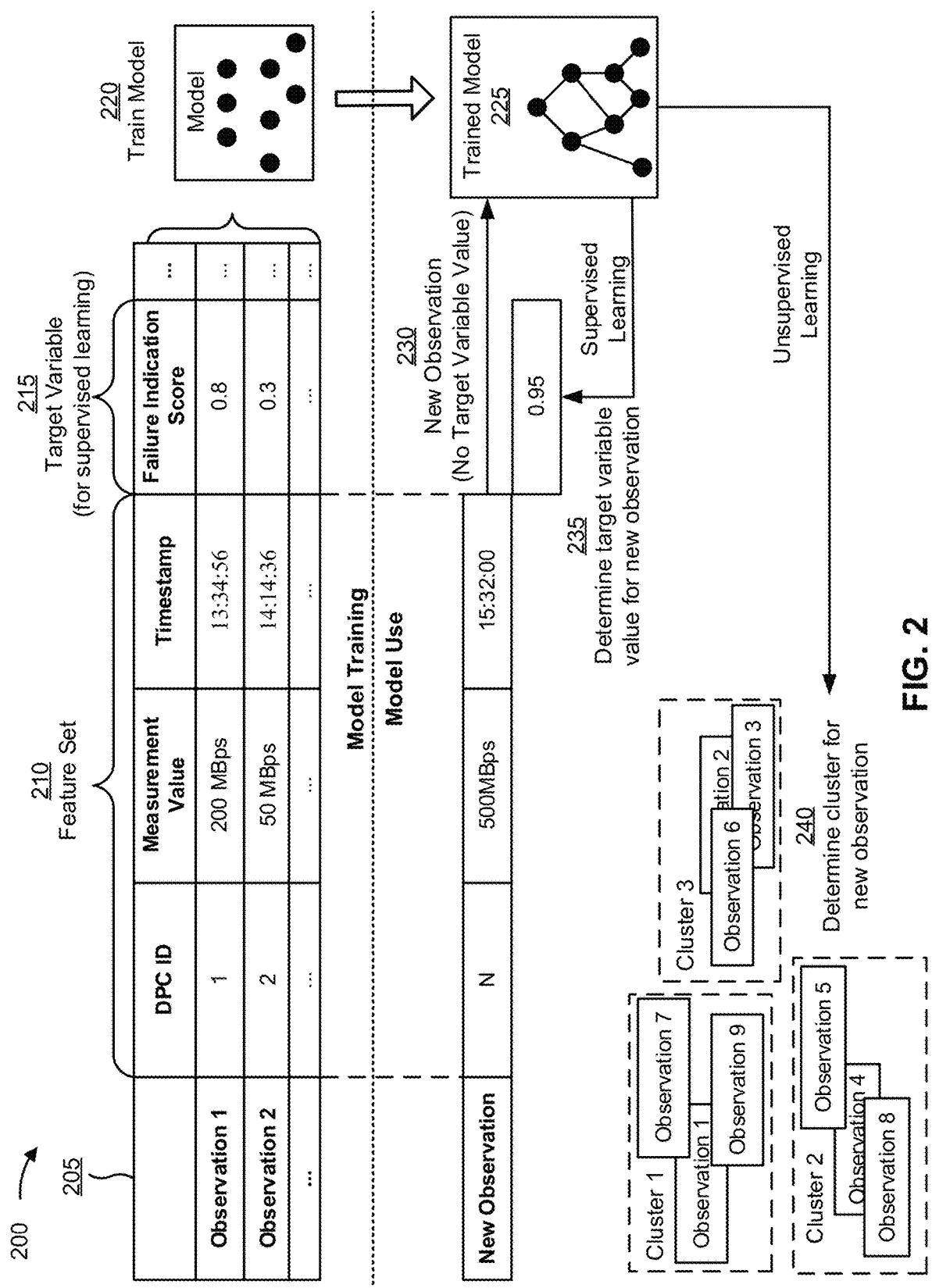
FIG. 2 is a diagram of an example machine learning model associated with predicting failure of a network device.

FIG. 2 is a diagram illustrating an example 200 of training and using a machine learning model in connection with predicting failure of a network device. The machine learning model training and usage described herein may be performed using a machine learning system. The machine learning system may include or may be included in a computing device, a server, a cloud computing environment, or the like, such as the network monitoring system described in more detail elsewhere herein.

As shown by reference number 205, a machine learning model may be trained using a set of observations. The set of observations may be obtained from historical data, such as training data gathered during one or more processes described herein. In some implementations, the machine learning system may receive the set of observations (e.g., as input) from a network device (e.g., the PGW and/or the DPCs of example 100), as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the PGW. For example, the machine learning system may identify a feature set (e.g., one or more features and/or feature values associated with one or more traffic metrics, one or more failures of a DPC, and/or the like) by extracting the feature set from structured data (e.g., reported measurements of traffic metrics) and/or by receiving input from an operator.

As an example, a feature set for a set of observations may include a first feature of a DPC identification, a second feature of a measurement value, a third feature of a timestamp, and so on. As shown, for a first observation, the first feature may have a value of "1," the second feature may have a value of "200 MBps," the third feature may have a value of 13:34:56, and so on. These features and feature values are provided as examples, and may differ in other examples. For example, the feature set may include one or more of the following features: traffic metric type, DPC network location, DPC service type, quantity of active sessions of the network device, DPC capacity, DPC load, network device load, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels) and/or may represent a variable having a Boolean value. A target variable may be associated with a target variable value, and a target variable value may be specific to an observation. In example 200, the target variable is a failure indication score, which has a value of 0.8 for the first observation and a value of 0.3 for the second observation.

The target variable may represent a value that a machine learning model is being trained to predict, and the feature set may represent the variables that are input to a trained machine learning model to predict a value for the target variable. The set of observations may include target variable values, so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature value N, a second feature value of 80 MBps, a third feature value of 15:32:00, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 0.5 for the target variable of a failure indication score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, replacing and/or repairing a DPC card. The first automated action may include, for example, sending an alert to a management device, reassigning one or more network services of the DPC to another DPC, resetting the DPC, deactivating the DPC, and/or the like.

As another example, if the machine learning system were to predict a value of 0.2 for the target variable of a failure indication score, then the machine learning system may provide a second (e.g., different) recommendation (e.g., continue monitoring) and/or may perform or cause performance of a second (e.g., different) automated action (e.g., send a message to indicate that no action should be taken with respect to the DPC).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., predicted failure), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., no failure predicted), then the machine learning system may provide a second recommendation (e.g., the second recommendation described above) and/or may perform or cause performance of a second automated action (e.g., the second automated action described above).

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to predict whether a component is likely to fail (e.g., within a certain time period). The machine learning system enables recognition and/or identification of tens, hundreds, thousands, or millions of features and/or feature values for tens, hundreds, thousands, or millions of observations, thereby increasing accuracy and consistency and reducing delay associated with predicting failure of a DPC, relative to requiring computing resources to be allocated for tens, hundreds, or thousands of operators to manually detect and/or predict failure using the features or feature values.

As indicated above, FIG. 2 is provided as an example. Other examples may differ from what is described in connection with FIG. 2.

Figure 3:
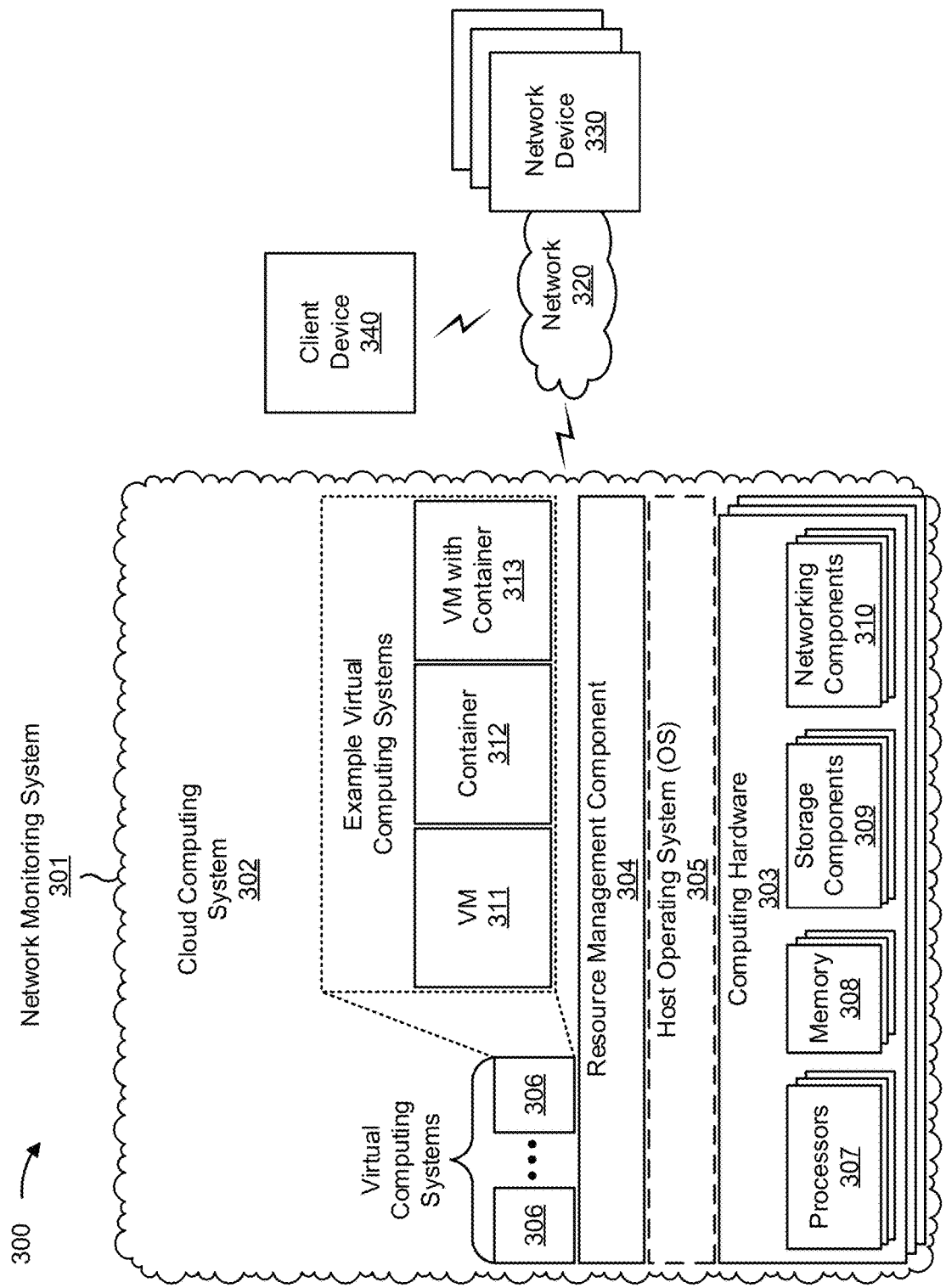
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a network monitoring system 301, which may include one or more elements of and/or may execute within a cloud computing system 302. The cloud computing system 302 may include one or more elements 303-313, as described in more detail below. As further shown in FIG. 3, environment 300 may include a network 320, one or more network devices 330 (referred to herein individually as "network device 330", and collectively as "network devices 330"), and/or a client device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the network monitoring system 301 may include one or more elements 303-313 of the cloud computing system 302, may execute within the cloud computing system 302, and/or may be hosted within the cloud computing system 302, in some implementations, the network monitoring system 301 may not be cloud-based (e.g., may be implemented outside of a cloud computing system) or may be partially cloud-based. For example, the network monitoring system 301 may include one or more devices that are not part of the cloud computing system 302, such as device 400 of FIG. 4, which may include a standalone server or another type of computing device. The network monitoring system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The network device 330 includes one or more devices capable of receiving, processing, storing, routing, and/or providing traffic (e.g., a packet, other information or metadata, and/or the like) in a manner described herein. For example, the network device 330 may include the PGW of example 100, a router, such as a label switching router (LSR), a label edge router (LER), an ingress router, an egress router, a provider router (e.g., a provider edge router, a provider core router, and/or the like), a virtual router, and/or the like. Additionally, or alternatively, the network device 330 may include a gateway, a switch, a firewall, a hub, a bridge, a reverse proxy, a server (e.g., a proxy server, a cloud server, a data center server, and/or the like), a load balancer, and/or a similar device. In some implementations, the network device 330 may be a physical device implemented within a housing, such as a chassis. In some implementations, the network device 330 may be a virtual device implemented by one or more computing devices of a cloud computing environment or a data center. In some implementations, a group of network devices 330 may be a group of data center nodes that are used to route traffic flow through a network.

The client device 340 includes one or more devices capable of sending and/or receiving traffic that is to be processed by the network device 330 and/or monitored by the network monitoring system 301, as described elsewhere herein. The client device 340 may include a communication device and/or a computing device. For example, the client device 340 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
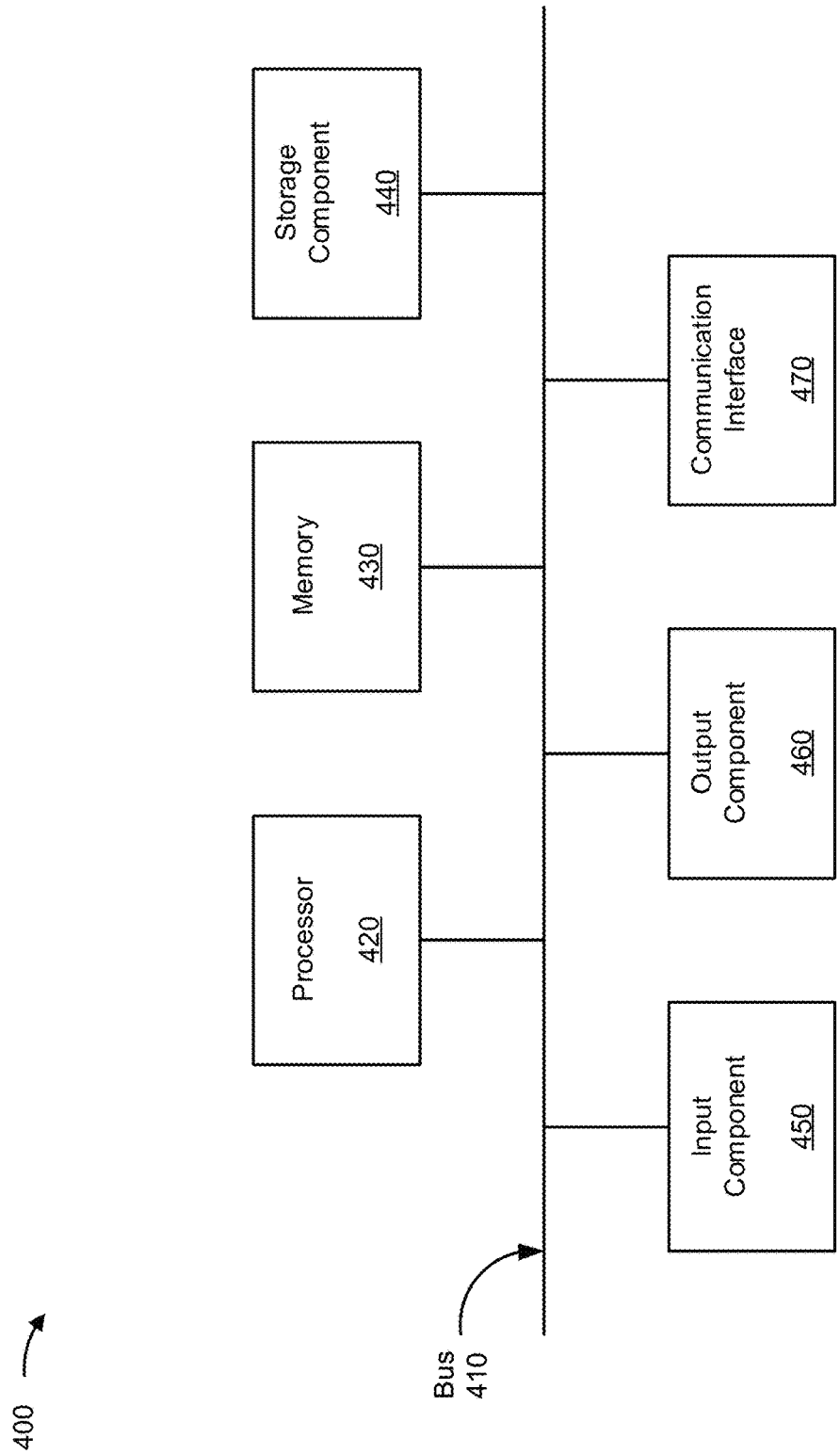
FIG. 4 is a diagram of example components of one or more devices of FIG. 3.

FIG. 4 is a diagram of example components of a device 400, which may correspond to the network monitoring system 301, the network device 330, and/or the client device 340. In some implementations, the network monitoring system 301, the network device 330, and/or the client device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
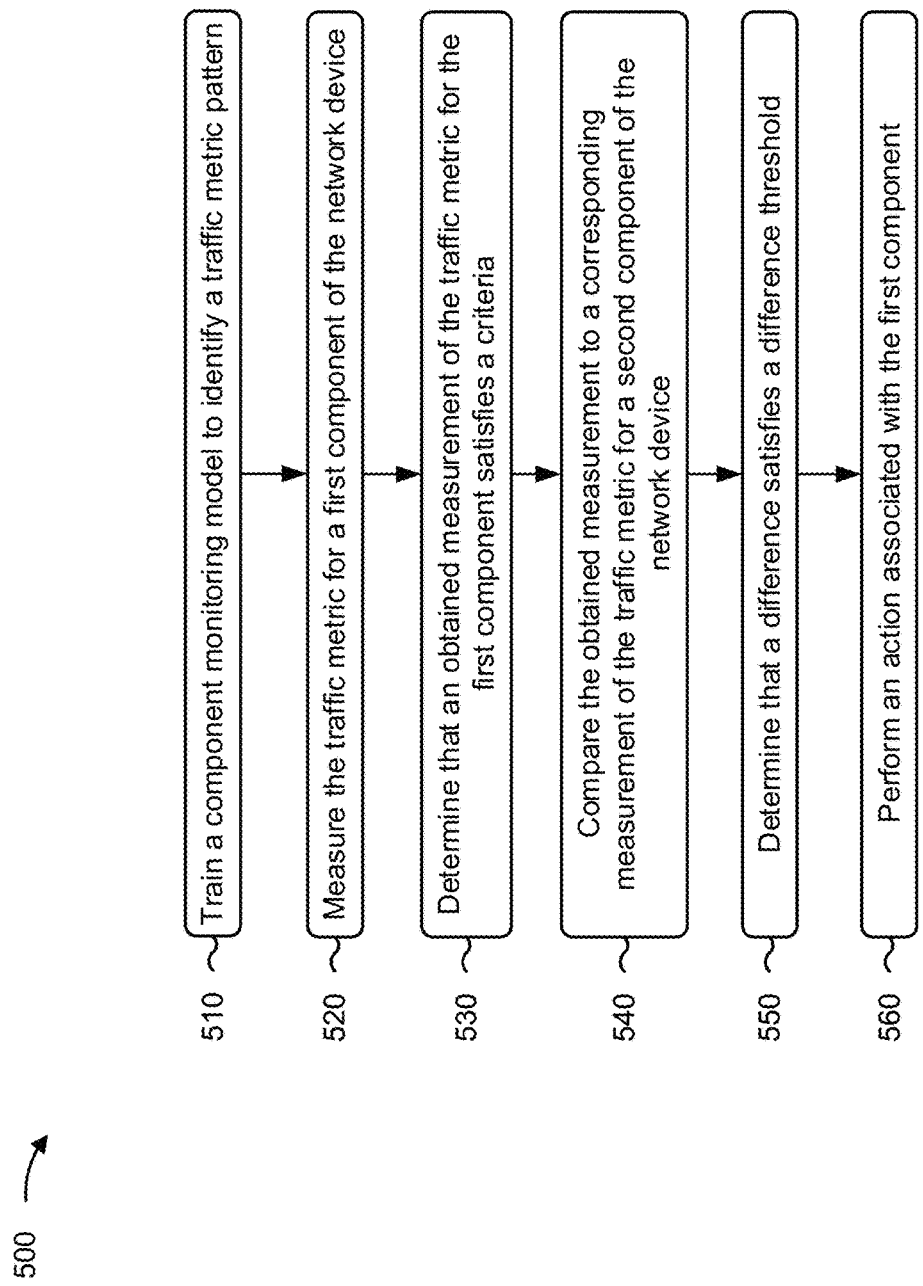
FIG. 5 is a flowchart of an example process associated with predicting failure of a network device.

FIG. 5 is a flowchart of an example process 500 associated with predicting failure of a network device. In some implementations, one or more process blocks of FIG. 5 may be performed by a network monitoring system (e.g., network monitoring system 301). In some implementations, one or more process blocks of FIG. 5 may be performed by another device or a group of devices separate from or including the network monitoring system, such as a network device (e.g., network device 330), and/or a client device (e.g., client device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include training a component monitoring model to identify a traffic metric pattern (block 510). For example, the device may train, during a training period, a component monitoring model to identify, from training measurements of a traffic metric for a set of components of a network device, a traffic metric pattern, as described above.

In some implementations, the component monitoring model is trained based on training data, associated with the traffic metric, obtained during the training period. The training period may be between an installation of the network device with the set of components within a network and an identification of the traffic metric pattern. The component monitoring model may include and/or be associated with a machine learning model that is configured to recognize patterns associated with the traffic metric based on a similarity analysis of a plurality of sliding windows of the training measurements that are associated with a same time period.

As further shown in FIG. 5, process 500 may include measuring the traffic metric for a first component of the network device (block 520). For example, the device may measure the traffic metric for a first component of the network device, as described above.

As further shown in FIG. 5, process 500 may include determining that an obtained measurement of the traffic metric for the first component satisfies a criteria (block 530). For example, the device may determine, based on the trained component monitoring model, that an obtained measurement of the traffic metric for the first component satisfies a criteria (e.g., a potential failure threshold, a potential failure profile, and/or the like) associated with the traffic metric pattern, as described above.

The network monitoring system may determine that the obtained measurement satisfies the criteria by determining that a value of a z-score associated with the obtained measurement satisfies a threshold score. The z-score may be determined based on a value of the obtained measurement, an average of corresponding training measurements that are associated with a same time slot of the criteria, and/or a standard deviation of the corresponding training measurements.

As further shown in FIG. 5, process 500 may include comparing the obtained measurement to a corresponding measurement of the traffic metric for a second component of the network device (block 540). For example, the device may compare, based on determining that the obtained measurement satisfies the criteria, the obtained measurement to a corresponding measurement of the traffic metric for a second component of the network device, as described above.

In some implementations, the first component and the second component comprise a same type of component of the network device. Additionally, or alternatively, the network device may be a PGW of a network, the first component may be a first data processing card of the PGW, and the second component may be a second data processing card of the PGW.

As further shown in FIG. 5, process 500 may include determining that a difference satisfies a difference threshold (block 550). For example, the device may determine that a measurement difference between the obtained measurement for the first component and the corresponding measurement for the second component satisfies a difference threshold, as described above. In some implementations, the network monitoring system may determine whether the obtained measurement corresponds to a measurement of a failure indication pattern of measurements that is identified based on training the component monitoring model.

As further shown in FIG. 5, process 500 may include performing, based on the measurement difference satisfying the difference threshold, an action associated with the first component (block 560). For example, the device may perform, based on the measurement difference satisfying the difference threshold, an action associated with the first component, as described above.

In some implementations, performing the action comprises at least one of: sending an alert to a management device that indicates that the first component is potentially failing, reassigning one or more network services of the first component to another component of the network device, resetting the first component, or deactivating the first component.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold (e.g., a threshold associated with a criteria) may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device and based on using a component monitoring model, that an obtained measurement, of a traffic metric for a first component of a network device, satisfies a criteria associated with a traffic metric pattern,
      wherein the component monitoring model is trained to identify the traffic metric pattern;
   determining, by the device, that a measurement difference between the obtained measurement and a corresponding measurement, of the traffic metric for a second component of the network device, satisfies a difference threshold; and
   performing, by the device and based on the measurement difference satisfying the difference threshold, one or more actions associated with the network device.

2. The method of claim 1, wherein the criteria corresponds to a potential failure criteria associated with one or more thresholds that are indicative of a potential failure.

3. The method of claim 1, wherein the component monitoring model is trained based on training measurements associated with the traffic metric.

4. The method of claim 1, wherein the component monitoring model is trained based on failure detection data that is associated with detected failures of one or more components of the network device.

5. The method of claim 1, wherein the traffic metric comprises one or more of:
a throughput,
a quantity of active traffic sessions being processed,
a load or capacity,
a processing speed, or
a packet error rate.

6. The method of claim 1, wherein the component monitoring model is configured to perform a similarity analysis to identify patterns associated with the traffic metric.

7. The method of claim 1, wherein the criteria corresponds to a z-score associated with the obtained measurement satisfying a threshold value.

8. A non-transitory computer-readable medium storing a set of instructions, the set of instructions comprising:
one or more instructions that, when executed by one or more processors of a device, cause the device to:
determine, based on using a component monitoring model, that an obtained measurement, of a traffic metric for a first component of a network device, satisfies a criteria associated with a traffic metric pattern,
wherein the component monitoring model is trained to identify the traffic metric pattern;
determine that a measurement difference between the obtained measurement and a corresponding measurement, of the traffic metric for a second component of the network device, satisfies a difference threshold; and
perform, based on the measurement difference satisfying the difference threshold, one or more actions associated with the network device.

9. The non-transitory computer-readable medium of claim 8, wherein the one or more instructions further cause the device to:
train, during a training period, the component monitoring model to identify a failure indication pattern based on training measurements of the traffic metric for a set of components of the network device.

10. The non-transitory computer-readable medium of claim 8, wherein the network device comprises a packet gateway.

11. The non-transitory computer-readable medium of claim 8, wherein the first component comprises a first data processing card and the second component comprises a second data processing card.

12. The non-transitory computer-readable medium of claim 8, wherein the component monitoring model based on detected failure data that is generated based on the component monitoring model detecting one or more components of the network device that are inactive due to a failure.

13. The non-transitory computer-readable medium of claim 8, wherein the traffic metric comprises a metric that can be monitored for a data processing card.

14. The non-transitory computer-readable medium of claim 8, wherein the obtained measurement is associated with an anomalous measurement.

15. A device, comprising:
one or more processors configured to:
determine, based on using a component monitoring model, that an obtained measurement, of a traffic metric for a first component of a network device, satisfies a criteria associated with a traffic metric pattern,
wherein the component monitoring model is trained to identify the traffic metric pattern;
determine that a measurement difference between the obtained measurement and a corresponding measurement, of the traffic metric for a second component of the network device, satisfies a difference threshold; and
perform, based on the measurement difference satisfying the difference threshold, one or more actions associated with the network device.

16. The device of claim 15, wherein the one or more processors are further configured to:
analyze previously received traffic metric measurements based on the obtained measurement corresponding to a last measurement of a failure indication pattern.

17. The device of claim 15, wherein the one or more processors are further configured to:
analyze subsequently received traffic measurements to determine whether the obtained measurement corresponds to a measurement of a failure indication pattern.

18. The device of claim 15, wherein the one or more processors are further configured to:
compare the obtained measurement to the corresponding measurement to determine the measurement difference.

19. The device of claim 15, wherein the different threshold corresponds to a fixed ratio or a z-score based on a plurality of measurements associated with one or more components of the network device.

20. The device of claim 15, wherein the one or more actions include one or more of:
suspending one or more network services provided by the first component,
reassigning the one or more network services to another component of the network device,
cause the network device to deactivate the first component,
reset cause the network device to reset the first component,
send an alert to a client device used to manage the network, or
schedule a repair or replacement of the first component.

* * * * *